(12) United States Patent
Manzo

(10) Patent No.: US 6,450,075 B1
(45) Date of Patent: Sep. 17, 2002

(54) VENTILATED AIR COOLED CUTTING SYSTEM

(76) Inventor: Alex Manzo, 106 Fox Ridge La., Winfield, PA (US) 17889

( * ) Notice: Subject to any disclaimer, the term of this patent is extended or adjusted under 35 U.S.C. 154(b) by 0 days.

(21) Appl. No.: 09/339,994

(22) Filed: Jun. 25, 1999

(51) Int. Cl.$^7$ .............................. B26D 7/08; B27B 5/29
(52) U.S. Cl. ............................. 83/171; 83/664; 83/676; 83/698.41; 83/835
(58) Field of Search .......................... 83/835, 676, 664, 83/170, 171, 425.3, 665, 698.41, 678, 22, 98, 169

(56) References Cited

U.S. PATENT DOCUMENTS

| | | | | |
|---|---|---|---|---|
| 88,949 A | * | 4/1869 | Emerson ..................... | 83/840 |
| 191,198 A | * | 5/1877 | Tilton ......................... | 83/835 |
| 212,813 A | * | 3/1879 | Miller ......................... | 83/835 |
| 213,439 A | * | 3/1879 | Miller ......................... | 83/835 |
| RE9,197 E | * | 5/1880 | Lockwood .................. | 100/289 |
| 320,681 A | * | 6/1885 | Perkins ........................ | 407/56 |
| 384,979 A | * | 6/1888 | Hurd ........................... | 83/835 |
| 635,509 A | * | 10/1899 | Rowe et al. ................. | 407/56 |
| 1,083,645 A | * | 1/1914 | Wettstein ..................... | 83/835 |
| 2,563,559 A | * | 8/1951 | Sneva ......................... | 29/527.6 |
| 3,107,706 A | * | 10/1963 | Heinemann .................. | 76/112 |
| 3,156,274 A | * | 11/1964 | Golick ......................... | 83/170 |
| 3,730,038 A | * | 5/1973 | Farb ............................ | 407/11 |
| 3,750,503 A | * | 8/1973 | McMillan ..................... | 83/16 |
| 3,961,548 A | * | 6/1976 | Claassen ..................... | 83/169 |
| 4,232,580 A | * | 11/1980 | Stewart ....................... | 83/676 |
| 4,240,315 A | * | 12/1980 | Tuomaala .................... | 83/835 |
| 4,253,360 A | * | 3/1981 | Zontelli ........................ | 83/39 |
| 4,574,676 A | * | 3/1986 | Jansen-Herfeld ............ | 83/835 |
| 4,615,245 A | * | 10/1986 | Boggs et al. ................. | 83/346 |
| 4,643,060 A | * | 2/1987 | Fremion ...................... | 83/169 |
| 4,776,251 A | * | 10/1988 | Carter, Jr. .................... | 83/835 |
| 4,805,506 A | * | 2/1989 | Gosnell ....................... | 83/347 |
| 4,870,946 A | * | 10/1989 | Long et al. ................... | 83/171 |
| 5,060,545 A | * | 10/1991 | Keith et al. ................... | 83/15 |
| 5,090,287 A | * | 2/1992 | Chezem ....................... | 83/835 |
| 5,392,758 A | * | 2/1995 | Rognon ....................... | 83/676 |
| 5,713,259 A | * | 2/1998 | Haanschoten ............... | 83/676 |
| 5,802,947 A | * | 9/1998 | Ward et al. .................. | 83/835 |

* cited by examiner

Primary Examiner—Allan N. Shoap
Assistant Examiner—Stephen Choi
(74) Attorney, Agent, or Firm—McNees Wallace & Nurick; Carmen Santa Maria; Brian T. Sattizahn

(57) ABSTRACT

A ventilated air cooled cutting system for a circular saw that produces a thinner kerf than previously achievable. The air cooled cutting system is comprised of a saw blade having a thin blade cutting portion and a thick hub portion. The blade cutting preferably is ground from a plate, while the hub portion remains substantially the thickness of the starting plate material. The thicker hub portion serves as a heat sink to conduct heat away from the thinner blade cutting portion. Cooling holes are provided in the hub portion to provide convection cooling of the hub portion. The thicker hub portion also provides rigidity or stiffness to the blade so that it is better able to withstand torsional forces experienced during the cutting operation. If additional cooling is required, a spacer collar having a series of axial and radial apertures can be fitted to the hub portion to force cooling air through the hub portion in order to enhance cooling.

26 Claims, 2 Drawing Sheets

VENTILATED AIR COOLED CUTTING SYSTEM

BACKGROUND OF THE INVENTION

1. Field of the Invention

The present invention is directed to a ventilated air cooled cutting system having the ability to generate a thin cut in a material without overheating, and specifically, to a saw blade having a thin kerf with an integral cooling system to prevent overheating.

2. Description of the Prior Art

Within the wood processing industry, it has always been desirable to cut wood with the thinnest possible kerf, the kerf being the width of a cut made by a cutting tool. This is due to the fact that a larger kerf destroys more product while producing more waste as sawdust, while a thinner kerf produces a higher yield with less waste. A thinner saw blade is required in order to produce a thinner kerf. While thin kerfs of about 0.080 are produced by some band saw blades, band saws have a much slower cutting speed, making them less efficient.

Although it has been desirable to design a circular saw blade as thin as possible for a particular application, problems with designs have arisen physically limiting the ability minimize blade thickness. One of these problems is the generation of heat produced by the cutting action of circular saw blades as well as the torsional forces produced during the cutting operation. Of course, there are several variables that contribute to the generation of heat and production of torsional forces. Included among these variable are feed rates, species of wood being cut and condition of the cutting equipment. Nevertheless, when critical amounts of heat and torsion are produced, the saw blade can fail.

Typically, as blades are made thinner to reduce the kerf, they are less able to withstand torsion than thicker blades. In addition, the thinner blades have less mass and unlike thicker blades which can act more like a heat sink, having a higher heat capacity and more heat transfer capabilities, thinner blades have a tendency to become hotter faster. This tendency, coupled with the higher torsional forces, results in an undesirable shortening of the blade life.

Various solutions have been attempted to solve these problems. One proposed solution is set forth in U.S. Pat. No. 213,439 to Miller dated Mar. 18, 1879. This solution sets forth a blade having ventilating holes. While such a blade design can improve the transfer of heat, assuming the cooling holes are not clogged with sawdust, the design does not address the problem of torsion. Similar solutions are set forth in U.S. Pat. No. 88,949 to Emerson dated Apr. 13, 1869; U.S. Pat. No. 212,813 to Miller dated Mar. 4, 1879; U.S. Pat. No. 1,083,645 to Wettstein dated Jan. 6, 1914; U.S. Pat. No. 3,872,763 to Kayahara dated Mar. 25, 1975; and U.S. Pat. No. 4,776,251 to Carter dated Oct. 11, 1988. While these patents set forth apertures having varying geometries and arranged in various patterns to provide cooling for blades, they do not address the problems related to torsion associated with blades as they become thinner.

A second approach to improving saw blade operation is to reduce vibration by drilling slots in the blades. An added advantage to these slots is the ability to dissipate heat. This approach is set forth in U.S. Pat. No. 2,563,559 to Sneva dated Aug. 7, 1951; U.S. Pat. No. 3,107,706 to Heinemann dated Aug. 12, 1960; U.S. Pat. No. 3,730,038 to Farb dated May 1, 1973; U.S. Pat. No. 4232,580 to Stewart dated Nov. 11, 1980; and U.S. Pat. No. 4,240,315 to Tuomaala dated Dec. 23 1980. However, this approach may allow for use of a thinner blade due to reduced vibration and improved heat dissipation, it does not address the problem of shortened blade life associated with torsional effects.

What is lacking in the art is a blade that produces a thinner kerf, while providing sufficient cooling to prevent heat buildup in the blade, yet has sufficient strength to withstand torsion during cutting, so that blade life is not shortened.

SUMMARY OF THE INVENTION

The present invention is a cutting system comprising an air cooled cutting system that includes a circular saw blade that produces a thinner kerf, while having improved cooling capabilities, yet has sufficient strength and stiffness so that torsional effects of cutting do not adversely affect the life of the saw blade. The saw blade of the present invention preferably is formed from plate stock and has a blade cutting portion and a hub cooling and strengthening portion.

The blade cutting portion has a preselected diameter and a first thickness. These thicknesses can vary, but can be thinner than those currently utilized in the art. The blade cutting portion is a disk having an outer periphery. A plurality of blade teeth are formed in the outer periphery of the disk to provide a cutting surface. The teeth can assume a variety of forms depending upon the type of cut required and the type of material that is being cut. Blade teeth technology is well known in the art. The blade cutting portion may optionally include slots or strobes as described in the prior art to alter the natural vibration frequency of the blade.

The hub cooling and strengthening portion has an outer diameter smaller than the outer diameter of the blade cutting portion and having a second thickness greater than the first thickness of the blade cutting portion. Thus, the blade undergoes a cross-sectional change at the hub. This increased thickness has the effect of acting as a heat sink for the blade. As heat is generated in the blade cutting portion, the heat is transferred by conduction to the larger mass of the hub portion. The thicker hub portion also provides the additional advantage of being a strengthening member for the saw blade. Thus, the stiffer cross-section provided by the thicker hub assists in reducing the overall torsional effects to which the blade is subjected. The hub cooling and strengthening portion includes inner diameter defining a bore through which passes a motor-driven shaft that is used to provide the rotational motion for the blade during cutting operations. Because heat will be transferred by conduction to the hub portion, it is necessary to provide additional cooling to the hub beyond that which occurs as a result of natural circulation of air across hub surfaces. This additional cooling is provided by a plurality of cooling apertures extending through the second thickness of the hub in a substantially axial direction. These apertures are positioned on a diameter located intermediate the hub portion inner diameter and the hub portion outer diameter.

The cutting system of the present invention may include radially oriented slots which extend inwardly from the outer periphery of the blade and terminate within the blade cutting portion. These strobes or slots are within the art to modify the vibrational frequency of the blade. These slots typically are cut in a radial position and extend between the outer periphery of the blade cutting portion and the outer diameter of the blade cutting portion.

If additional cooling is required for the blade portion, the diameter of the hub portion can be adjusted to increase the heat capacity of the hub portion, thereby allowing more heat to be conducted away from the blade portion to the hub portion. Additional cooling to transfer heat away from the hub portion can be achieved by providing additional cooling apertures in the hub portion positioned between the hub portion inner diameter and the hub portion outer diameter.

An advantage of the present invention is that a blade having a thinner kerf can be made, without adversely affecting the life of the blade. Another direct advantage is the ability to saw a workpiece while reducing the amount of waste, thereby increasing the yield.

Another advantage of the present invention is that a blade having a thinner cutting portion can be produced without adversely affecting the ability of the blade to withstand the torsional effects of the sawing operations.

Still another advantage of the present invention is that the improved design permits the thin blade to be cooled efficiently by use of a thick hub as a heat sink for conductive heat transfer, while the hub is cooled by convection cooling. This cooling helps to extend the blade life by preventing deterioration from overheating.

Other features and advantages of the present invention will be apparent from the following more detailed description of the preferred embodiment, taken in conjunction with the accompanying drawings which illustrate, by way of example, the principles of the invention.

BRIEF DESCRIPTION OF DRAWINGS

Whenever possible, the same reference numbers will be used throughout the figures to refer to the same parts.

DETAILED DESCRIPTION OF THE INVENTION

Figure 1:
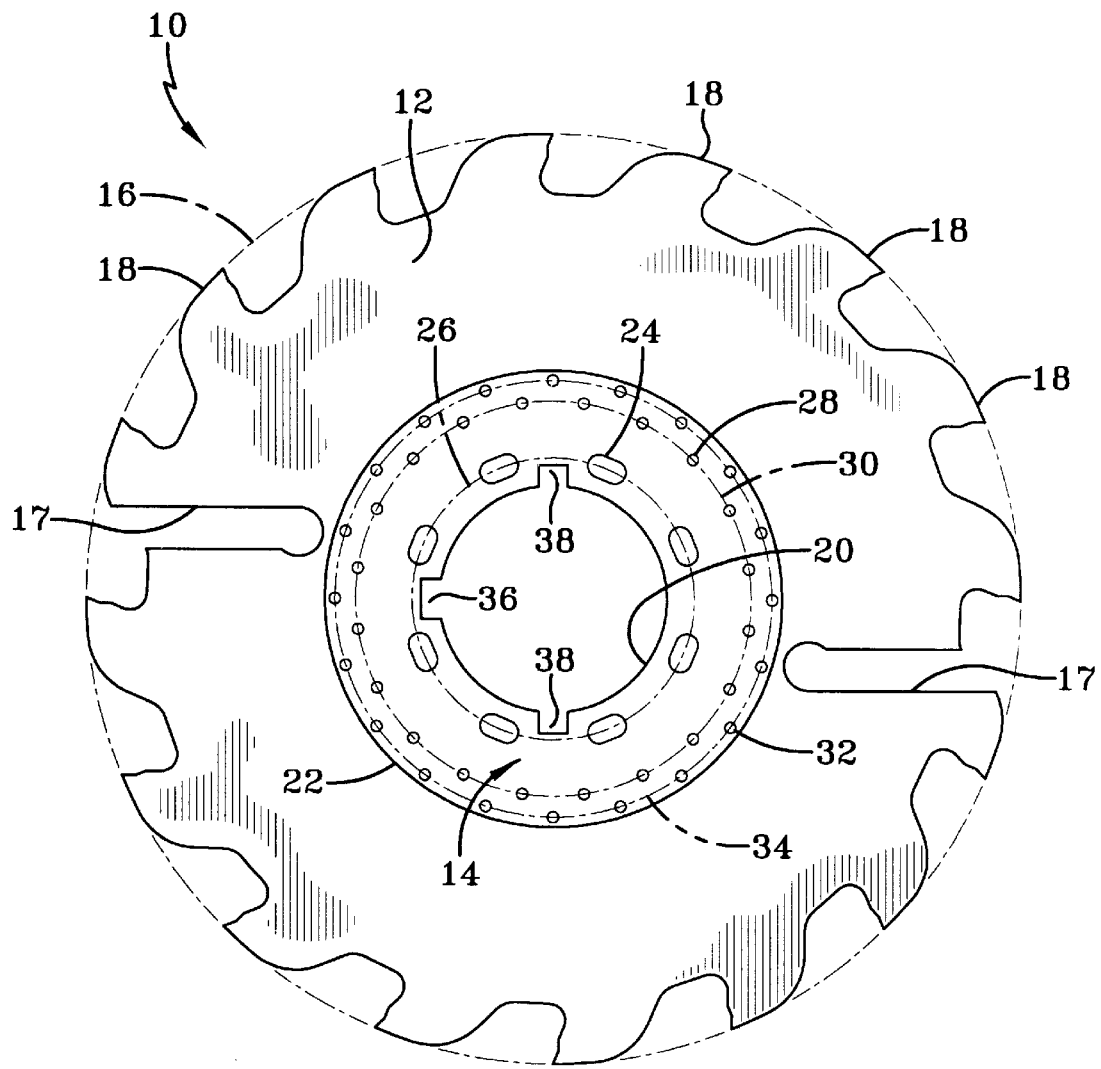
FIG. 1 is a side view of a circular saw blade having a blade cutting portion and a hub cooling and strengthening portion of the present invention.

Referring now to FIG. 1, which is a side view of a circular saw blade that comprises one embodiment of the cutting system of the present invention. A saw blade 10 includes a blade cutting portion 12 and a hub cooling and strengthening portion 14. The blade portion has a preselected outer diameter that forms the outer periphery or circumference 16 of blade cutting portion 12. This outer diameter will vary depending on the use of the blade, and typically will vary from about 7 inches for small saws to about 40 inches for large saws such as are found in large saw mills. In the most preferred embodiment, this diameter will vary from about 8–14 inches. A plurality of blade teeth are formed in the outer circumference of the blade. The design and the methods of forming the blade teeth on the outer circumference of the blade are well known in the art and are not within the scope of this invention. The blade portion has a predetermined thickness, which may vary from 0.045 inches to about 0.240 inches. Preferably the blade portion thickness is in the range of from about 0.050–0.100 inches. In the best mode of practicing this invention, the thickness of the blade portion has been varied from about 0.060–0.070 inches. The thicknesses of the blade are determined by the ultimate use of the blade, as well as by the method of manufacturing the blade as will be explained subsequently. However, blades currently used in saw mills typically produce kerfs larger than 0.100 inches. It can be seen that blades made in accordance with the present invention can produce kerfs from about 0.100 inches to as low as 0.045 inches, which is a significant improvement over the current state of the art. Blade cutting portion 12 also includes optional slots or strobes 17 for vibrational damping. While two strobes 17 are shown, any number of strobes as practiced in the art may be used.

The hub cooling and strengthening portion 14 is integral with the blade portion 12, but is thicker than the blade portion 12. The thickness of hub portion 14, which typically is dependent on the thickness of the starting material, can be selected to be in any range. This selection must be balanced by the limitations regarding overall blade rigidity. Hub portion thickness is chosen so that to be thicker than blade portion 12 in order to provide additional rigidity or stiffness to the saw blade in order to counterbalance torsional effects as the blade rotates and cuts. If additional cooling is required a thicker stock of starting material may be selected, although torsional considerations are also a factor in selection. Typically, the hub cooling and strengthening portion 14 has a thickness of between 0.060 to about 0.250 inches. The upper limit of ¼" is currently dictated by the availability of the preferred starting material, which typically is plate. However, as plate is manufactured in larger sizes, or as other thicker forms of material become economically feasible, the thickness may be increased. Hub cooling portions have been tested in the range of about 0.090–0.110 inches with blade portion thicknesses in the range of 0.060–0.70 inches. Hub portion 14 includes an inner diameter 20 which forms a bore through which passes a motor-driven shaft that is used to provide the rotational motion for the blade during the cutting operations. This diameter will vary depending upon the size of the shaft onto which the blade is designed to fit. Since an arbor may also be used to mate up with a saw blade, this diameter may also be sized to fit a preselected arbor diameter. Hub portion 14 also includes an outer diameter 22 and is the transition from the thinner blade cutting portion to the thicker hub cutting portion. This diameter 22 can vary depending upon the amount of mass required for heat transfer requirements and torsional considerations, but typically is within 10 to 40% of the blade portion outer diameter. A first series of holes 24 is positioned on a first diameter 26 intermediate between hub portion inner diameter 20 and outer diameter 22. In FIG. 1, these holes 24 are shown as elongated in the preferred embodiment as will be explained, with their major diameter extending in a circumferential direction. However, this geometry is optional, and these holes can assume any geometrical configuration. A plurality of cooling apertures 28 are located on a second intermediate diameter 30 positioned between first intermediate diameter 26. Additional cooling holes at additional locations, such as cooling holes 32 located on third intermediate diameter 34, may optionally be provided when additional cooling is needed. Cooling holes 32, 34 provide additional surface area to facilitate convective cooling of hub portion 14.

Hub portion also includes an aligning means. In FIG. 1, the aligning means is shown as slots or keyways 36, 38. The aligning means may assume other forms, and only keyways are shown in FIG. 1.

When additional cooling is needed for a blade, the cutting system can be fitted with a spacer collar 40 having a predetermined thickness. In certain embodiments, which will be discussed, spacer collar 40 also provides a function in addition to cooling. Spacer collar 40 has an inner diameter 42 and an outer diameter forming an outer circumference 44. The size of inner diameter 42 is subject to the same considerations as inner diameter 20 of hub portion 14. Spacer collar 40 includes a plurality of cooling apertures 45 that are aligned on a first intermediate diameter 47 positioned between inner diameter 42 and outer diameter of the spacer collar and extend substantially axially through the thickness of the spacer collar. This diameter 47 corresponds to first intermediate diameter 26 of hub portion 14, and cooling apertures 45 are positioned so as to align with holes 24. As noted above, in the preferred embodiment, holes 24 are elongated, which makes alignment of holes 24 with cooling apertures 45 simpler, as the elongated holes allow for some tolerance mismatch. Thus, in the preferred embodiment, the axially oriented cooling holes 45 are circular in cross-section have a diameter approximately corresponding to the minor diameter of elongated holes 24.

Figure 2:
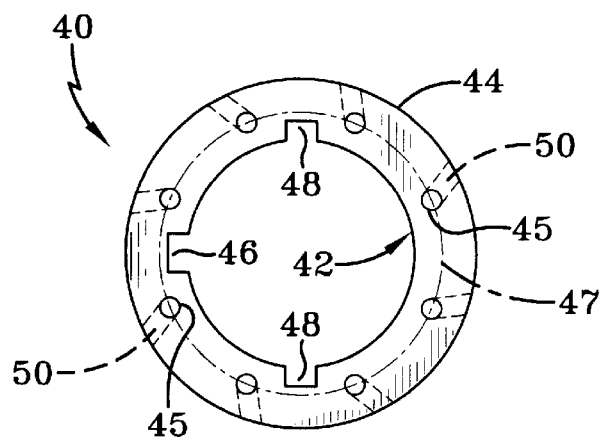
FIG. 2 is a side view of a spacer collar of the present invention.

Spacer collar 40 also includes a means for aligning collar with hub portion 14. As shown in FIG. 2, the aligning means includes a large slot or keyway 46 and two small slots or keyways 48. These keyways correspond to large keyway 36 and small keyways 38 on hub portion, and inner diameter 42 of spacer collar has the same diameter as inner diameter of hub portion 14. In the embodiment shown in the figures, at least one keyway of spacer collar 40 is aligned with at least one corresponding keyway of hub portion 14, and a key is inserted to prevent rotation. In a typical operation, the motor-driven shaft that fits through the inner diameters of hub portion and spacer collar has a standard key having a size corresponding to large keyways 36, 46 or two small keys corresponding to small keyway slots 38, 48. Other alignment means to align spacer collar 40 to hub portion 14 may be used. For example, spacer collar 40 on its face may include a pin which is received by a pin hole on a mating face of hub portion 14. Alternatively, spacer collar 40 may include a key or plurality of keys that corresponds to one or more of the keyways of hub portion 14. In yet another arrangement, the spacer collar 40 can be designed to have a surface that slides into inner diameter 20 of hub portion 14, with both inner diameter 20 and the spacer collar surface having a flat to prevent rotation. These represent just a few examples, as many other alignment and locking arrangements are well known in the art and can be interchanged for those discussed above. The only requirement is that spacer collar 40 be locked in position with respect to hub portion 14 so that alignment is maintained during operation. A means for positively locking either hub portion 14 or spacer collar 40 with respect to the other is preferred.

Space collar 40 also includes at least one substantially radially oriented cooling aperture 50 that extends from the outer circumference 44 of collar 40 and intersects at least one of the axial cooling holes 45. In a preferred embodiment, apertures 50 are located in a plane formed by the thickness of the spacer collar, so that the apertures 50 are substantially within the plane formed by the thickness of the spacer collar. The number of cooling apertures 50 will vary, being limited by clearances and by the available space along the around and along the circumference of spacer collar 40. The apertures 50 are positioned at an acute angle with respect to the circumference 44 of spacer collar 40, the acute angle being measured from and less than the right angle defined by a radial line extending from a center of the spacer collar 40 and a line tangent to outer circumference 44 of the spacer collar 40. The aperture 50 extends inward from the outer diameter of the spacer collar, intersecting at least one substantially axially-oriented cooling aperture 45. In a preferred embodiment, a plurality of cooling apertures 50 are positioned circumferentially along spacer collar 40. The cutting system is force-ventilated through the aligned arrangement of the spacer collar and the hub portion. This forced ventilation is in addition to cooling provided by conduction of heat to the hub portion 14, convection of heat by away from the hub portion 14 by axial cooling holes such as holes 28, and conduction of heat across the contact faces between hub portion 14 and spacer collar 40. The forced ventilation occurs as cooling air is circulated through hub portion 14, depending upon the direction of rotation of the blade, by either creating a vacuum that draws air into cooling apertures 50 as a negative pressure is created; or by forcing air through cooling apertures 50, as a positive pressure is created. The relationship of cooling apertures with the direction of blade rotation determines whether the pressure is positive or negative. The cooling air passes through axial holes 45 and through holes 24 of hub portion 12, drawing heat from the hub portion and the spacer collar by convective flow. In a preferred embodiment, the spacer collar 40 is made from a material having a heat transfer capability as great as or greater than the heat transfer capability of the material forming the circular saw blade. Some heat is transferred across the interface of hub portion 14 and spacer collar 40. Improved coupling between the interfaces as well as increased contact area between hub portion 14 and spacer collar 40 results in more efficient heat transfer due to conduction.

Of course, once coupling and contact area have been maximized, additional conductive heat transfer can occur when spacer collar has a greater heat capacity and heat transfer coefficient than the hub portion 14. In the best mode of practicing the present invention, the spacer collar 40 has been comprised of a material selected from the group of metals consisting of aluminum and its alloys, while the blades have been made from ferrous alloys, tool steels.

Figure 3:
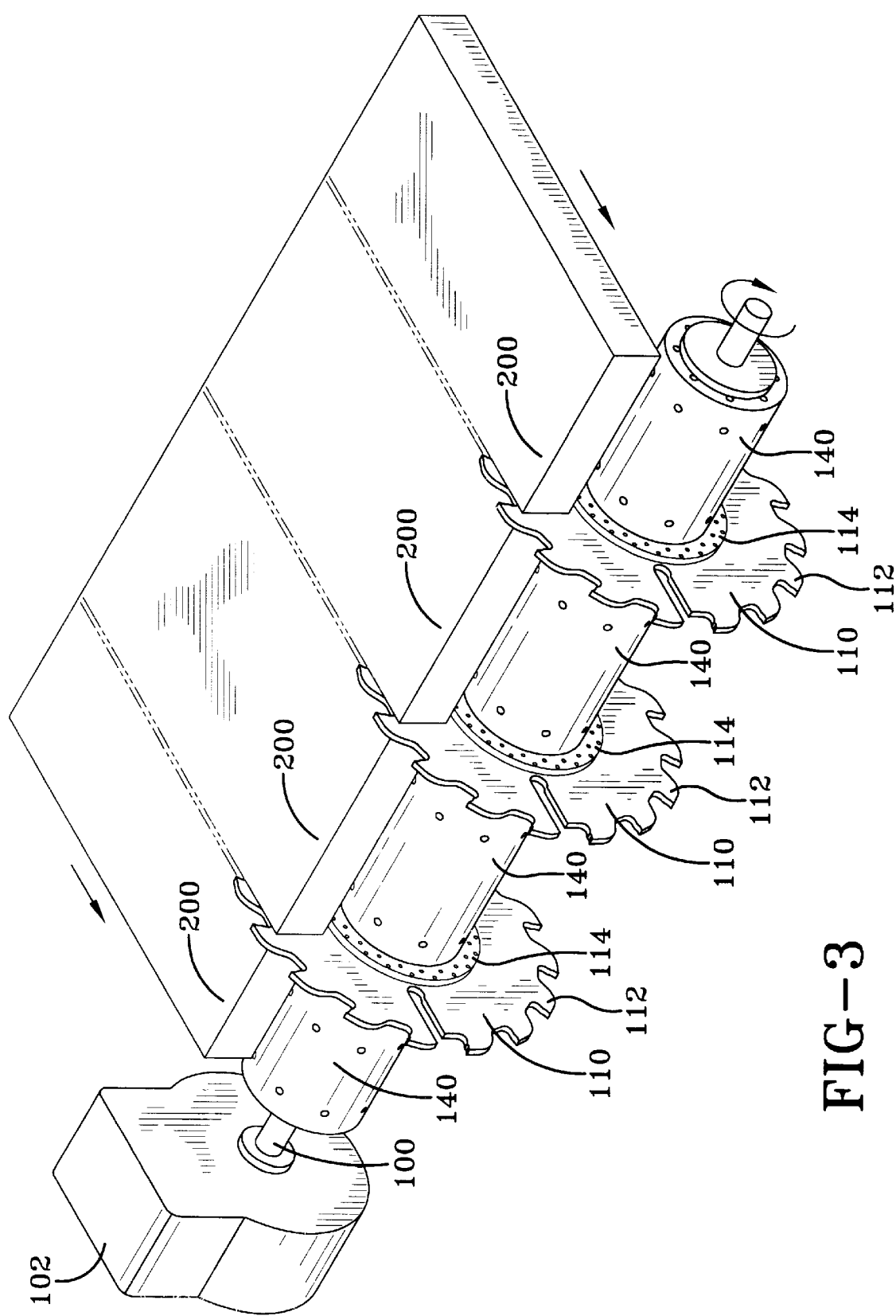
FIG. 3 is a perspective view of a Brewer system incorporating the low kerf blades of the present invention.

In one embodiment of the present invention, the low kerf, ventilated cutting system is used in conjunction with a Brewer cutting system to improve yield. A schematic of the system is shown in FIG. 3. The cutting system is comprised of a rotating shaft 100 driven by a motor 102 and the arrow indicates the direction of movement of the motor and the rotating shaft to which the blades are attached. The cuts or kerf are shown behind the blades as they move in the direction of the arrow. A plurality of circular saw blades 110 made in accordance with the present invention are mounted on the rotating shaft 100. Each saw blade 110 has a blade cutting portion 112 and a hub cooling and strengthening portion 114. Each blade portion 112 has a preselected outer diameter and a first thickness as previously described. The blade cutting portion 112 has an outer periphery that includes a plurality of blade teeth, not shown in FIG. 3. Each hub portion 114 has an outer diameter smaller than the outer diameter of blade portion 112 and has a second thickness greater than the first thickness of blade portion 112. Hub portion 114 further includes an inner diameter defining a bore, a first series of holes positioned on a first intermediate diameter, the first intermediate diameter located between the hub portion inner diameter and the hub portion outer diameter and a plurality of cooling apertures positioned on a second intermediate diameter, the second intermediate diameter located between the first intermediate diameter and the hub portion outer diameter, as previously discussed. Also included are means for aligning each hub portion 114 with the shaft 100. For the Brewer system, the shaft typically includes at least one key (not shown) on shaft 100 which mates with one of the keyways on the hub portion 114. When a Brewer system includes a single key on the rotating shaft, the key generally has a width of about ¼". When Brewer systems include two keys, the keys are usually located on the shaft 180° apart, and typically have a width of about ⅜". Also included is at least one spacer collar 140 extending between adjacent saw blades 110. In FIG. 3 a plurality of spacer collars 140 are shown. Each spacer collar 140 has a predetermined thickness that corresponds to the desired width of a workpiece 200 that is being sawed by blades 110. Each spacer collar 140 has an inner diameter and an outer diameter forming an outer circumference, means for aligning each spacer collar with the rotating shaft, again using a key and keyway arrangement, although any other suitable means may be employed, and a plurality of cooling apertures. Again, the cooling apertures are positioned on a first intermediate diameter positioned between the spacer collar inner diameter and outer diameter and oriented substantially axially through the thickness of the spacer collar as shown in FIG. 2. The spacer collar first intermediate diameter approximately corresponds to the hub portion first intermediate diameter so that the cooling apertures of the spacer collar align with the holes located on the hub portion first intermediate diameter. In a preferred embodiment, adjacent spacer collars 140 are positioned so that their planar cooling apertures are oriented in opposite directions with respect to the direction of rotation of the blades. This is desirable so that air will be forced continuously through cooling apertures of one spacer collar through hub portion holes and be sucked by the vacuum created by cooling apertures of the adjacent spacer collar. This will also prevent clogging of sawdust within either the spacer collar cooling apertures 45, 50 or hub portion holes 24. As can clearly be seen in the Brewer system, as the number of blades increases to produce thinner workpieces or as the width of the original board becomes greater, less waste is produced by the thinner kerf resulting from the blades of the present invention. When the original workpiece is sufficiently wide and sufficient cuts are made, additional work pieces can be produced, thereby increasing yield. In any circumstance, less waste in the form of sawdust will be produced, as less material is ground by the thinner blades of the present invention.

The saw blades of the present invention are manufactured by providing material having a thickness of at least about 0.060 inches. The minimum material thickness is established by the required thickness of the hub portion. The preferred material form is plate, although other suitable forms may be used. The blade cutting portion is formed by preferably wet grinding the heavier gage material, preferably plate, to the suitable thickness. The plate may also be machined to the appropriate thickness. One problem encountered when machining blade cutting portion 12, such as by machine lathing, is material spring back. Material normally is not removed from hub portion 14, although it may be adjusted if needed, again by grinding or other suitable machining operation. For example, if the starting material has a thickness of 0.060 inches, then the blade cutting portion may be ground to a thickness of about 0.045, and the hub portion will have the thickness of the starting material. Similarly, if plate starting material is about 0.250 inches, the blade cutting portion should be ground to a thickness of at least 0.240 or less, and the hub portion will have the thickness of the starting material. Of course, as the blade cutting portion is reduced, the hub portion can be suitably adjusted if desired or required. A bore hole is formed in the center of the hub cooling portion, the bore hole including at least one alignment feature, such as one of the features previously discussed. Holes and alignment features may be formed by any suitable technique such as trepanning, drilling, laser ablation or laser drilling. Blade teeth are formed on the outer diameter of the blade cutting portion by well known teeth forming methods. A plurality of holes located on a first intermediate diameter of the hub cooling portion between the bore hole and a hub cooling portion outer diameter are formed by methods well known in the art as previously discussed, as are the cooling apertures on intermediate diameters of the hub portion.

The geometric features of the spacer collar are machined in accordance with well known manufacturing techniques. The spacer collar is comprised of a material having good heat transfer properties, at least as good as the heat transfer properties of the saw blade. Aluminum or its alloys have been found to be acceptable, although the collar can be made from a tool steel similar to or identical to the blade. The spacer collar is provided in a thickness in the range of 0.125–4.0 inches. Any suitable material form can be used. Smaller thicknesses can be stampings, while larger sizes can be extruded forms such as pipe or the like or even ring forgings. The material form is not critical.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. A cutting system comprising:
    a circular saw blade having an axis of rotation, the saw blade having a blade portion integral with a hub portion,
        the blade portion having a preselected outer diameter and a first thickness, the blade portion having an outer periphery that includes a plurality of blade teeth, and
        the hub portion having an outer diameter smaller than the outer diameter of the blade portion and having a second thickness greater than the first thickness of the blade portion, the hub portion outer diameter transitioning between the second thickness of the hub portion and the first thickness of the blade portion, the hub portion further including an inner diameter defining a bore, a first series of holes positioned on a first intermediate diameter, the first intermediate diameter located between the hub portion inner diameter and the hub portion outer diameter and a plurality of cooling apertures positioned on a second intermediate diameter, the second intermediate diameter located between the first intermediate diameter and the hub portion outer diameter; and an alignment means; and
    a spacer collar, the spacer collar having a third thickness, an inner diameter and an outer diameter forming an outer circumference, means for aligning the spacer collar with the alignment means of the hub portion, and a plurality of cooling apertures, the plurality of cooling apertures positioned on a first intermediate diameter positioned between the spacer collar inner diameter and outer diameter and oriented substantially axially through the thickness of the spacer collar, the spacer collar first intermediate diameter approximately corresponding to the hub portion first intermediate diameter so that the plurality of cooling apertures of the spacer collar align with the holes located on the hub portion first intermediate diameter.

2. The cutting system of claim 1 wherein the spacer collar further includes at least one substantially radially-oriented cooling aperture extending between the outer circumference of the spacer collar and at least one substantially axially-oriented cooling aperture to permit a flow of air through the at least one radially-oriented cooling aperture into and through at least one axially-oriented cooling apertures.

3. The cutting system of claim 1 wherein the spacer collar has an outer surface extending over the third thickness of the spacer collar, the spacer collar further includes at least one additional cooling aperture located on the outer surface of the spacer collar and extending inward from the outer surface of the spacer collar and intersecting at least one of the substantially axially-oriented plurality of cooling apertures of the spacer collar to draw air through the at least one additional cooling aperture into and through the intersected at least one substantially axially-oriented cooling aperture.

4. The cutting system of claim 3 wherein the at least one additional cooling aperture of the spacer collar is positioned at an acute angle, the acute angle being an interior angle between a centerline of the at least one additional cooling aperture and a radial line extending from the center of the spacer collar through the intersection of the centerline of the at least one additional cooling aperture and a centerline of the at least one substantially axially-oriented cooling aperture.

5. The cutting system of claim 1 wherein the blade portion further includes at least one radially oriented slot extending inwardly from the outer periphery of the blade portion and terminating within the blade portion at a diametral location between the outer periphery of the blade portion and the outer diameter of the hub portion.

6. A The cutting system of claim 1 wherein the first series of holes positioned on the first intermediate diameter of the hub portion are elongated, having a major diameter and a minor diameter, and the axially-oriented cooling apertures located on the first intermediate diameter of the spacer collar have a major diameter less than the major diameter of the hub portion holes.

7. The cutting system of claim 6 wherein the axially-oriented cooling apertures have a circular cross section having a diameter approximately equal to the minor diameter of the elongated holes positioned on the first intermediate diameter of the hub portion.

8. The cutting system of claim 1 wherein the hub portion includes a plurality cooling apertures positioned on at least one additional intermediate diameter located between the second intermediate diameter and the hub portion outer diameter.

9. The cutting system of claim 1 wherein the thickness of the blade portion is between about 0.045–0.240 inches.

10. The cutting system of claim 9 wherein the thickness of the blade portion is between about 0.050–0.100 inches.

11. The cutting system of claim 10 wherein the thickness of the blade portion is between about 0.060–0.070 inches.

12. The cutting system of claim 11 wherein the thickness of the hub portion is between about 0.090–0.110.

13. The cutting system of claim 9 wherein the thickness of the hub portion is between about 0.060–0.250 inches.

14. The cutting system of claim 9 wherein the thickness of the spacer collar is between about 0.125–4.0 inches.

15. The cutting system of claim 1 wherein the preselected outer diameter of the blade portion is between about 7–40 inches.

16. The cutting system of claim 15 wherein the preselected outer diameter of the blade portion is between about 8–14 inches.

17. The cutting system of claim 1 wherein the materials comprising the spacer collar and the circular saw blade are selected so that the spacer collar material has a heat transfer capability greater than heat transfer capability of the circular saw blade.

18. The cutting system of claim 1 wherein the spacer collar material is comprised of a material selected from the group of metals consisting of aluminum and its alloys.

19. A cutting system comprising:
a rotating shaft defining an axis of rotation;
a plurality of circular saw blades mounted on the rotating shaft, each saw blade having a blade portion integral with a hub portion,
each blade portion having a preselected outer diameter and a first thickness, the blade portion having an outer periphery that includes a plurality of blade teeth, and
each hub portion having an outer diameter smaller than the outer diameter of the blade portion and having a second thickness greater than the first thickness of the blade portion, the hub portion outer diameter transitioning between the second thickness of the hub portion and the first thickness of the blade portion, the hub portion further including an inner diameter defining a bore, a first series of holes positioned on a first intermediate diameter, the first intermediate diameter located between the hub portion inner diameter and the hub portion outer diameter and a plurality of cooling apertures positioned on a second intermediate diameter, the second intermediate diameter located between the first intermediate diameter and the hub portion outer diameter; and means for aligning each hub portion with the shaft; and
at least one spacer collar extending between adjacent saw blades, each spacer collar having a predetermined third thickness, each spacer collar having an inner diameter and an outer diameter forming an outer circumference, means for aligning each spacer collar with the rotating shaft, and a plurality of cooling apertures, the plurality of cooling apertures positioned on a first intermediate diameter positioned between the spacer collar inner diameter and outer diameter and oriented substantially axially through the thickness of the spacer collar, the spacer collar first intermediate diameter approximately corresponding to the hub portion first intermediate diameter so that the plurality of cooling apertures of the spacer collar align with the holes located on the hub portion first intermediate diameter.

20. The cutting system of claim 19 wherein each spacer collar further includes at least one substantially radially-oriented cooling aperture extending inward from the outer circumference of the spacer collar and intersecting at least one substantially axially-oriented cooling aperture to permit a flow of air through the at least one radially-oriented cooling apertures into and through at least one axially-oriented cooling apertures.

21. The cutting system of claim 19 wherein each spacer collar has an outer surface extending over the third thickness of the spacer collar, each spacer collar further includes at least one additional cooling aperture located on the outer surface of the corresponding spacer collar and extending inward from the outer surface of the spacer collar and intersecting at least one substantially axially-oriented cooling aperture to draw air through the at least one additional cooling aperture into and through the at least one substantially axially-oriented cooling aperture.

22. The cutting system of claim 21 wherein the at least one additional cooling aperture of each spacer collar is positioned at an acute angle, the acute angle being an interior angle between a centerline of the at least one additional cooling aperture of each spacer collar and a radial line extending from the center of each spacer collar through the intersection of the centerline of the at least one additional cooling aperture and a centerline of the at least one substantially axially-oriented cooling aperture.

23. The cutting system of claim 22 further including at least two saw blades and at least two spacer collars, the at least one additional aperture of one of the at least two spacer collars being oriented with respect to the radial line extending from the center of the one of the at least two spacer collars in a direction corresponding to a direction of rotation of the at least two saw blades and the at least one additional aperture of another spacer collar of the at least two spacer collars adjacent to the one of the at least two spacer collars being oriented with respect to the radial line extending from the center of the another of the at least two spacer collars in a direction opposite to the direction of rotation of the at least two saw blades.

24. The cutting system of claim 19 wherein the rotating shaft includes at least one key.

25. The cutting system of claim 24 wherein the means for aligning each hub portion with the shaft includes at least one keyway slot dimensioned to accept at least one key of the rotating shaft, the at least one keyway slot located on the hub portion inner diameter.

26. The cutting system of claim 24 wherein the means for aligning each spacer collar with the shaft includes at least one keyway slot dimensioned to accept at least one key of the rotating shaft, the at least one keyway slot located on the keyway slot inner diameter.

* * * * *